United States Patent

[11] 3,617,867

[72] Inventor Gerherd Herzog
Houston, Tex.
[21] Appl. No. 368,547
[22] Filed July 17, 1953
[45] Patented Nov. 2, 1971
[73] Assignee Texaco Inc.
Continuation-in-part of application Ser. No. 238,754, July 26, 1951, now abandoned.

[54] METHOD AND APPARATUS FOR WELL LOGGING UTILIZING RESONANCE
69 Claims, 10 Drawing Figs.

[52] U.S. Cl. .................................................. 324/0.5
[51] Int. Cl. ............................................. G01n 27/78
[50] Field of Search .......................................... 324/35, 5, 0.5

[56] References Cited
UNITED STATES PATENTS
2,535,666  12/1950  Broding ....................... 324/5
2,222,136  11/1940  Bazzoni ....................... 324/5
3,083,335  3/1963   Schuster ...................... 324/0.5

OTHER REFERENCES
Electronics; April, 1953; pages 184, 185, 186, and 187 (Nuclear Resonance). Copy in Div. 48, 317– 35.
Physical Review; April 1, 1948; pages 679– 712 (Relaxation Effects in Nuclear Magnetic Resonance Absorption) Copy in Div. 48; 317– 35.
Bloembergen et al., " Physical Review" Vol. 73, pp. 679– 712. (April 1, 1948) (Copy in Div. 44, 324– 0.5).
Knoebel et al., " The Review of Scientific Instruments" Vol. 22, pp. 904– 911 (Dec. 1951) (Copy in Div. 44, 324– 0.5).

*Primary Examiner*—Michael J. Lynch
*Attorney*—W. P. Epperson

CLAIM: 1. In well logging, the improvement which comprises producing a unidirectional magnetic field in a region including earth adjacent the well, simultaneously producing in the same region an alternating magnetic field having a component of its vector transverse to that of the unidirectional magnetic field, the alternating magnetic field being tuned to the resonance frequency for nuclei of atoms present in a substance contained in the region, and detecting the resulting input of energy from the alternating magnetic field to the nuclei.

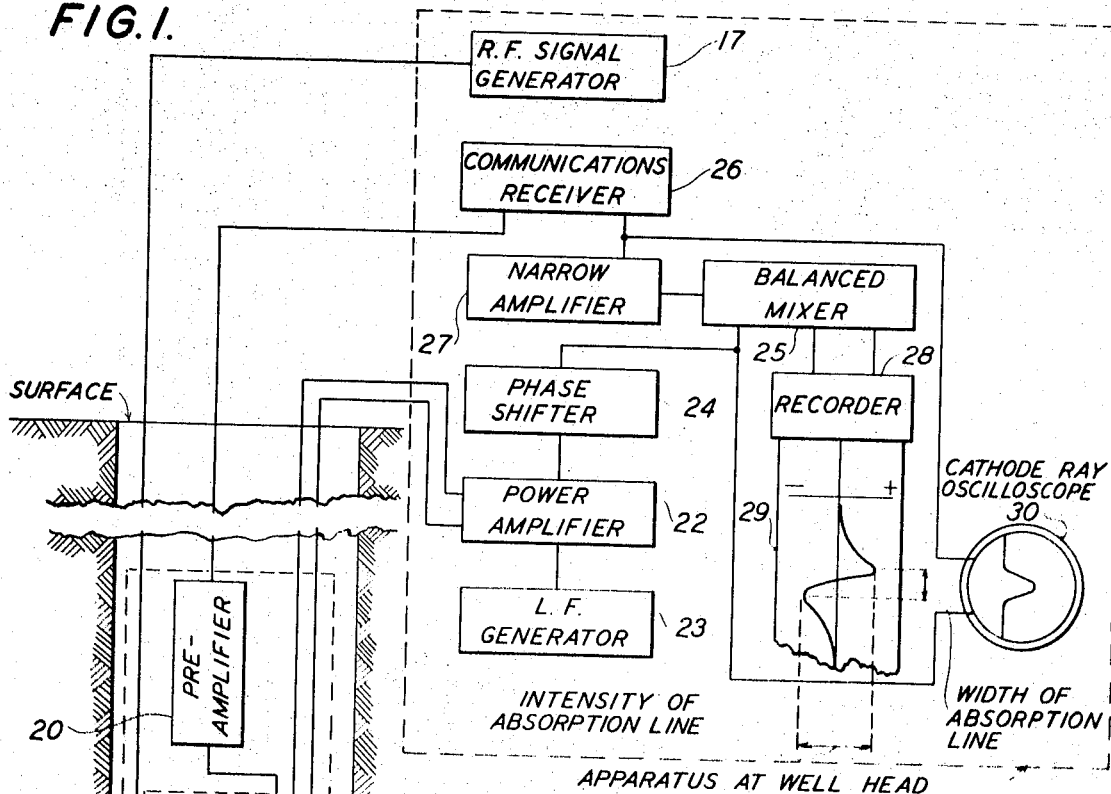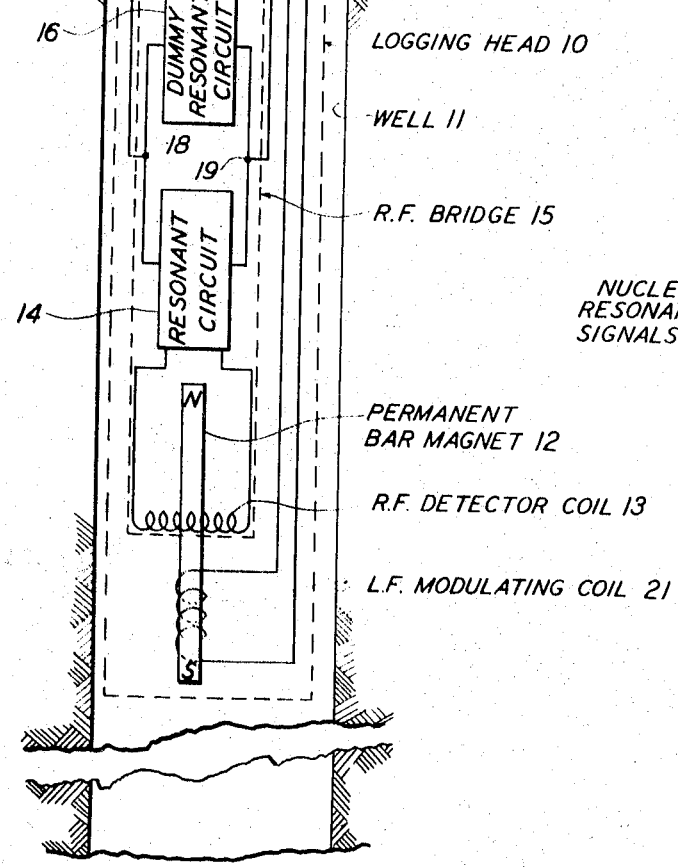

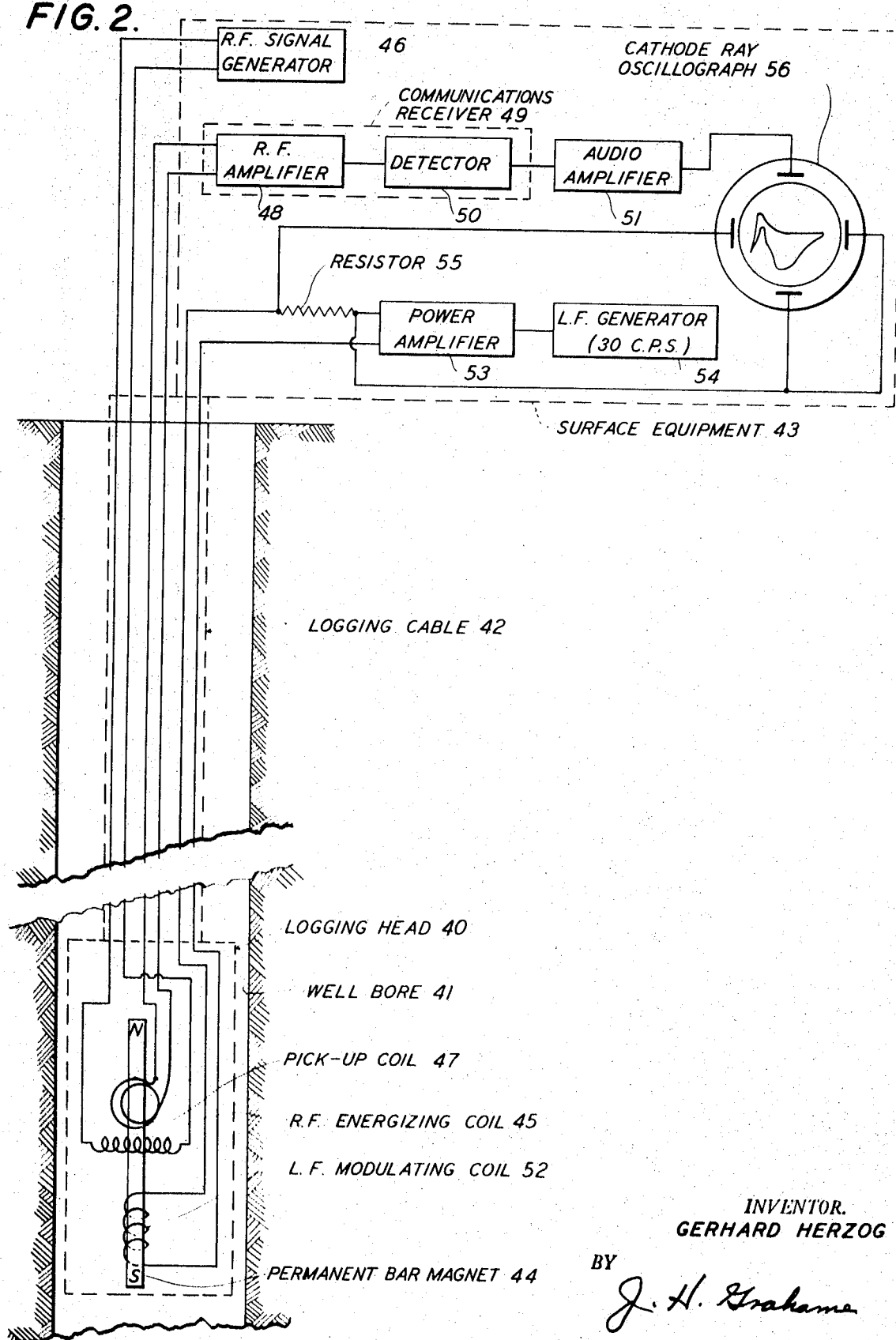

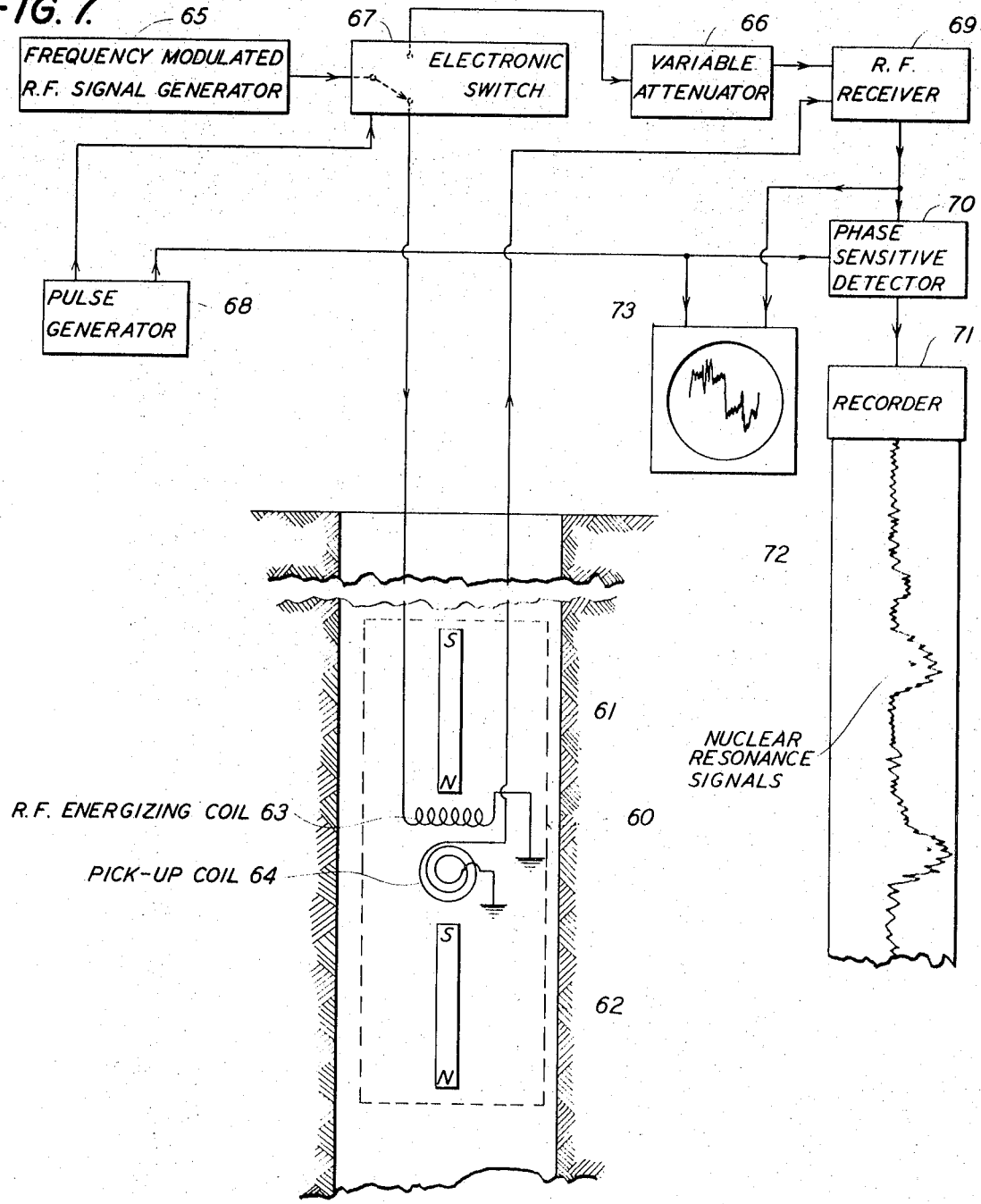

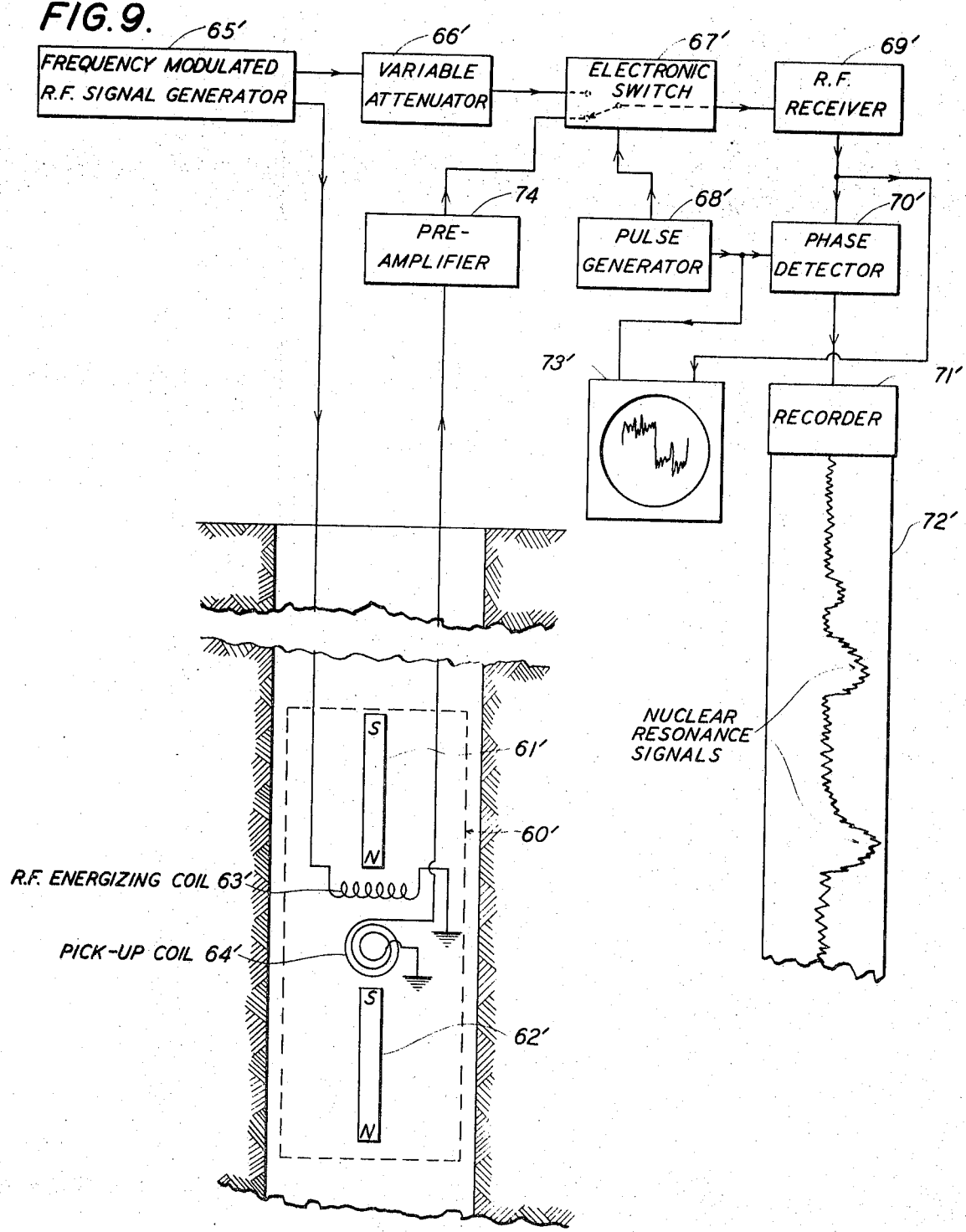

METHOD AND APPARATUS FOR WELL LOGGING UTILIZING RESONANCE

The present application is a continuation-in-part of my application, Ser. No. 238,754 which was filed on July 26, 1951, now abandoned.

This invention is concerned with geophysical examinations and particularly with the location and identification of mineral deposits. It finds major application in well logging, particularly oil well logging, and provides improvements in method and apparatus to the end that the presence and location of mineral deposits, for example deposits of petroleum hydrocarbons, may be detected positively and with greater certainty than has been possible previously. The invention is based upon the fact that nuclear magnetic resonance effects vary from one mineral deposit to another and also upon the fact that these resonance effects depend to some extent upon the local environment of the nucleus. The same kind of atoms in different substances exhibit different nuclear resonance phenomena. More particularly, the resonance frequency, the relaxation time, the resonance intensity, the resonance line shape, and the resonance line width for the proton magnetic moment differ depending upon whether the proton is present in water or petroleum hydrocarbons, and these differences may be detected in situ in a well bore or the like.

One of the more serious problems in exploration for and development of petroleum deposits involves the determination of the location and thickness of petroleum deposits involves the determination of the location and thickness of petroleum containing strata or formations penetrated by the drill. The extraction of a complete core from a well is expensive and frequently impossible, and potential oil-producing horizons may be penetrated without ever finding them. In many cases the oil-bearing formations at the point of penetration are so "tight" or impermeable that little or no hydrocarbons escape into the bore. In other cases the hydrostatic head maintained on the bore by the drilling mud may be so high that flow is in the reverse direction, i.e. water from the mud is forced into the formation and drives oil or gas away from the bore. In consequence, petroleum deposits of great value remain undiscovered and are cased or cemented off as the well is drilled into deeper formations.

In an effort to avoid the foregoing difficulties a number of methods have been developed for logging well bores. In electrical methods of logging, one or more electrodes are drawn up the well bore while the value of potential, resistivity or some other parameter of the circuit, which includes the rock adjacent to the bore, is measured and plotted against well depth to produce a log. In radiation logging, natural or induced radiation, for example gamma radiation, is measured by means of a radiation detector drawn up the bore, and the intensity of the detected radiation is plotted against depth. In the case of induced radiation measurements, a radioactive source is drawn up the bore along with the detector. Logs of both types are useful if the geological section penetrated by the well is known at least approximately, for example as the result of coring. Certain formations may give responses or patterns on the log, which will aid in identifying them when they are again encountered on a log for a neighboring well. In consequence, electrical and radiation logs are useful in establishing correlations between wells in a given field or area but seldom, if ever, give any positive indication of the presence of hydrocarbons. Logs of neutron intensity may indicate the presence of hydrogen in the rock adjacent the well bore, but give no indication as to whether this hydrogen is present as water or in hydrocarbons.

I have developed a logging method whereby the presence of petroleum hydrocarbons as well as other minerals in the formations penetrated by a well may be detected directly, so that even in an unknown and previously unexplored geological section the presence of a potential petroleum-producing horizon or of an ore body is much less likely to escape detection. The method of my invention is dependent upon the fact that nuclear magnetic resonance effects are dependent upon chemical state. As applied to the discovery of petroleum hydrocarbons, the invention is dependent upon the fact that the proton resonance effects in water differ measurably from those in petroleum hydrocarbons.

According to current views, atoms consist of a nucleus containing most of the mass, and planetary electrons. The simplest atom is that of hydrogen 1, and consists of a single proton and a single planetary electron. Hydrogen 2 or deuterium, consists of a single planetary electron and a nucleus, which in turn is decomposable into one proton and one neutron. Hydrogen 3 or tritium consists of one planetary electron and a nucleus decomposable into one proton and two neutrons. All have the same number of protons in the nucleus, or the same atomic number, and are isotopes of each other. In general a neutral atom of any element has a number of planetary electrons equal to the atomic number, and its nucleus contains a number of protons equal to the atomic number and a number of neutrons sufficient to give the nucleus its observed isotopic mass. To illustrate, Carbon 12 has atomic number 6 and atomic weight 12. It consists of six planetary electrons and a nucleus of six protons and six neutrons.

Now neutrons, protons and electrons all possess an intrinsic spin angular momentum and an associated magnetic moment. In addition protons and electrons give rise to magnetic fields by virtue of the motion of their charges. The gross magnetic properties of materials are attributed primarily to ordering of electronic magnetic moments.

The spin and orbital angular moments of the separate protons and neutrons in a nucleus combine to give a resultant angular momentum generally called the nuclear spin. Associated with this spin is a magnetic moment whose value depends on the particular way in which the separate spins are combined. A simple rule that seems to hold is that when an even number of protons and of neutrons are both present in the nucleus, their respective angular momenta add to give zero and hence have no associated magnetic moment. Carbon 12, for example, has an even number both of protons and neutrons, and hence no magnetic moment; whereas hydrogen 1 with a single proton, hydrogen 2 with a proton and a neutron, and hydrogen 3 with a proton and two neutrons all have nuclear magnetic moments.

A compass needle exhibits the property of a permanent magnetic moment. Placed in a magnetic field, its energy depends on its orientation with respect to this field, and its stable position of minimum energy exists when it is lined up with the field. By the expenditure of energy it can be caused to assume other orientations. However, the nuclear magnetic moment, by virtue of "space-quantization" can only assume a limited number of distinguishable orientations, and correspondingly can only absorb or emit energy in amounts corresponding to changes between allowed orientations. The number of orientations is given by ($2I+1$), where $I$ is the quantum number of the nuclear angular momentum. Thus a proton, since it has $I=1/2$, has two orientations, roughly parallel and antiparallel to the field direction. The angular momentum, to which the magnetic moment is coupled, precesses around the field directions at a rate proportional to the magnetic field strength, in such a way that its component along the field direction is constant.

If in addition to a steady magnetic field, varying fields with frequency components in the neighborhood of the Larmor precession frequency are present, the nuclear magnetic moment may be caused to change its orientation by a resonance effect. If the frequency of an applied oscillating magnetic field, which is oriented at right angles to the direction of the static magnetic field, matches that corresponding to the difference in energy between adjacent orientations according to the rule, Planck's constant times the frequency equals the energy jump, then the transition will occur. If the match is not close, transitions will be very unlikely.

For example, when a magnetic field of strength 1,826 gauss is applied to a sample of water, the protons which form the hydrogen 1 nuclei have only two possible orientations with respect to the field. The "parallel" orientation has the least energy. At this field strength it requires about $5\times10^{120}$ ergs to excite the "antiparallel" orientation. This corresponds to a frequency of 7.76 megacycles per second. The resonance frequency can be computed in general from the following formula:

Resonance frequency =

$$\frac{\text{Steady magnetic field strength}}{\text{Planck's constant}} \times \frac{\text{Nuclear Magnetic moment}}{\text{Nuclear Angular Momentum}}$$

For protons this gives 4,250 × magnetic field strength in gauss, or to take the example above 4,250×1,826=7.76 megacycles per second. Since the magnetic field at each proton is not exactly the same, the resonance will occur in a narrow band of frequencies centered on 7.76 megacycles. The resonance line width, which is the measure of this band width, depends on the inhomogeneities in the applied field, as well as those arising from the internal structure of the material.

Except when they are under the influence of a magnetic field the magnetic moments of the protons of hydrogen are in random orientation — for before the field is applied, the parallel and antiparallel positions of the nuclei are no different in energy and equally likely to occur. Upon application of the field, the protons snap into line with substantially half parallel and the remainder antiparallel, but this is not a stable condition in the field, because with the field applied, the antiparallel state of the proton has a higher energy, and hence tends to emit this energy difference and drop to the lower parallel state. This tendency is counteracted by thermal motion, which gives rise to field components at the resonant frequency, and hence to transitions up and down between the two states. As a result, an equilibrium is established at any given temperature where there is a slight excess occupation of parallel states compared with antiparallel states. This equilibrium condition is not, however, attained the instant the magnetic field is switched on, but rather is approached according to a characteristic time known as the thermal relaxation time.

I have discovered that it is possible to distinguish accurately between different minerals in situ and particularly between water and petroleum hydrocarbons in situ in a well. The protons of hydrogen in petroleum compounds have resonant frequencies, resonant line widths, resonance intensities, and thermal relaxation times that vary substantially from those of the protons in the hydrogen of water. One or more of these properties may be employed in differentiating between petroleum and water, and I have devised methods and apparatus for doing this in a well. In accordance with my invention, the presence of petroleum compounds and other minerals in the rock adjacent any level in a bore hole may be detected directly.

The method of the invention involves the production of a unidirectional magnetic field, hereinafter abbreviated as DC magnetic field, in the rock adjacent the bore hole, for example by means of a permanent bar magnet disposed upright in the hole and of such proportions and field strength that the region of high field strength extends out into the formation through which the hole penetrates. An oscillating magnetic field of radio frequency is simultaneously produced, for example by means of a coil whose axis is transverse to that of the bore hole. If the oscillating magnetic field is tuned to a frequency corresponding to the proton nuclear Larmor precession frequency in the adjacent formation, radio frequency energy will be absorbed and scattered. The absorption lowers the Q of the driving RF circuit element, and can be detected and measured by standard nuclear-absorption techniques. Nuclear-dispersion techniques measure the phase shift in the signal in the RF drive circuit, while nuclear-induction techniques measure the signal induced in an additional pickup coil placed with its axis at right angles to those of both the driver coil and the well bore.

If the DC or steady magnetic field is modulated by superimposing upon it a fluctuating magnetic field, for example with a low-frequency coil wound around the bar magnet, the protons of the hydrogen present may be caused to attain the resonant condition periodically. As energy is absorbed, the distribution between parallel and antiparallel states is altered. In the intervals between when resonance is attained, relaxation will occur as the protons return to thermal equilibrium. This relaxation time may be measured. The thermal relaxation times of hydrogen protons in hydrocarbons and in water are dependent upon the chemical and physical environments of the protons. At room temperature, hydrogen protons of crude oil samples have relaxation times which are only small fractions of the relaxation times of hydrogen protons of water, and hydrogen protons of hydrocarbons in other environments ordinarily have relaxation times which are different from the relaxation times of protons of hydrogen in water. Thus measurements based upon the relaxation times of hydrogen protons provide a means for distinguishing between hydrocarbons and water. The intensity of the magnetic resonance effect whether it be observed as nuclear absorption, nuclear dispersion or nuclear induction, depends on the relaxation time, since the maximum intensity observed is that at which the number of protons being excited by the magnetic oscillations equals the number being deexcited by the relaxation effect.

Relaxation times, as indicated above, are very different for the hydrogen protons of hydrocarbons and water and may be determined by measuring the dependence of signal strength on frequency of modulation of the steady magnetic field.

Resonance frequency, resonance intensity, and relaxation time may, if desired, be determined simultaneously in an apparatus which comprises a logging head adapted to be lowered and raised in a bore hole and provided with a magnet for passing DC magnetic lines of force into adjacent formations, the term DC being used to describe magnetic lines of force produced by a permanent magnet or an electromagnet energized by direct current. A modulating coil wound around the magnet superimposes a slowly fluctuating magnetic field upon that produced by the magnet itself. Means, for example an energizer coil, is placed in the logging head to produce an RF field transverse to the field of the magnet in the region undergoing investigation. This radio frequency is adjusted so that a condition of resonance is achieved in the formations as the modulating current fluctuates back and forth. Each time the resonant condition is attained there will be a drain of energy from the RF circuit, which may be represented as a peak in an otherwise constant demand. The height of the peak is a measure of the intensity of the particular magnetic resonance effect being investigated.

If the DC magnetic field is unmodulated, the nuclear resonance phenomena in the formations can be determined by varying or periodically sweeping the frequency of the radio frequency signal over a predetermined range.

Ordinarily it is necessary to employ a nonhomogeneous DC magnetic field in the regions of the formations in which nuclear resonance phenomena is measured. With such an arrangement, periodic variations in the DC magnetic field strength or frequency modulation of the oscillating magnetic field serves to extend the regions in which nuclear resonance tends to occur.

In summary, my invention contemplates producing a DC magnetic field (which may or may not be modulated by an alternating magnetic field) in a region including earth adjacent a well, producing in the same region an alternating magnetic field having a component of its vector transverse to that of the DC magnetic field, the alternating magnetic field being tuned to the resonance frequency for nuclei of a certain type. As indicated above, the term "DC magnetic field" is employed herein to mean a magnetic field the direction and intensity of which do not change with respect to time, except as it may be modulated by a magnetic vector which varies relatively slowly and by relatively small amounts with respect to time.

In another aspect, the invention may be described as involving the production of a DC magnetic field (which may or may not be modulated as described above) in the earth adjacent a well, simultaneously (and in the same region as that in which the DC magnetic field is produced) producing an alternating magnetic field having a component of its vector transverse to that of the DC magnetic field, this component being relatively week with respect to the DC magnetic field in the region, and detecting energy exchanged between the alternating magnetic field and substances in the earth. The detection may involve detection of changes of magnitude of the signal, or the determination of relaxation time of the substances.

If an unmodulated DC magnetic field is produced in the formations, the alternating magnetic field may be varied or frequency modulated in order to provide an indication of the nuclear resonance phenomena.

These and other aspects of my invention will be understood more readily in the light of the following detailed description, taken in conjunction with the accompanying drawings, in which:

FIGS. 1 and 2 are schematic diagrams of two different forms of logging apparatus of my invention employing a modulated DC magnetic field;

FIGS. 3 and 4 illustrate records obtainable from the apparatus of FIG. 1 when a nonhomogeneous DC magnetic field is produced in the formations;

FIG. 7 is a schematic diagram of an embodiment of the logging apparatus employing an unmodulated DC magnetic field and a frequency modulated radio frequency field;

FIG. 9 shows a modification of the apparatus of FIG. 7.

Figure 5:
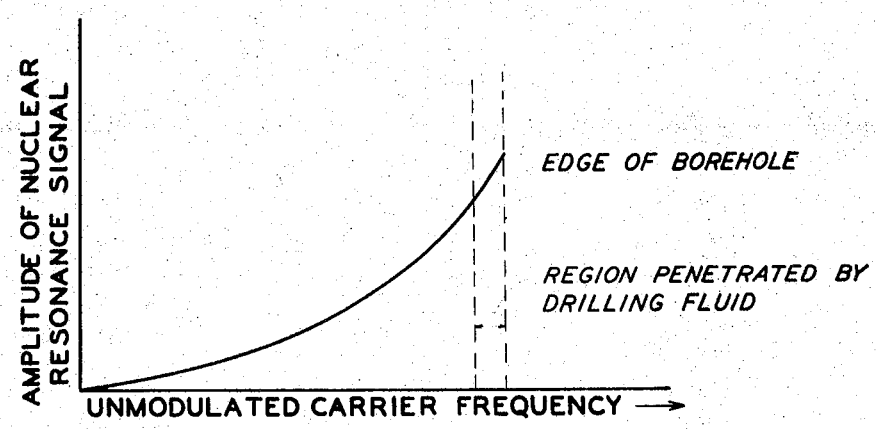
FIGS. 5 and 6 show curves which illustrate the nuclear resonance signals obtainable when the frequency of the alternating magnetic signal is varied over a wide range.

The apparatus of FIG. 1 comprises a logging head 10 which may be moves up and down a well 11 by a conventional logging cable (not shown). The logging head contains a permanent bar magnet 12 that has sufficiently great magnetic moment that its lines of force penetrate the rock in which the well is bored. Within the field of the magnet and perpendicular to its major axis is a detector coil 13 which is part of a resonance circuit 14. This resonant circuit is connected in an RF bridge 15 with a dummy resonant circuit 16 which has the same characteristics as the first resonant circuit when the latter is not undergoing nuclear resonance. A variable RF signal generator 17 (at the surface of the ground) is connected through the cable to one side of the bridge between the resonant circuits (both of which are in the logging head) at a point 18. The mixing point 19 on the other side of the bridge is connected to a preamplifier 20 disposed in the logging head. The section of the bridge between the point 19 and the resonant circuit 14 is selected to introduce a half-wave shift by conventional means. By way of example, this may be achieved by making the electrical length of the connection between the point 19 and the resonant circuit 14 one-half wavelength longer than the electrical length of the connection between point 19 and the dummy resonant circuit 16. In the alternative, the electrical length of the connection between the point 18 and the circuit 14 may be one-half wavelength longer than the electrical length of the connection between point 18 and the circuit 16. Consequently, the signal arriving normally at the mixing point under nonresonant conditions is practically zero.

A low-frequency-modulating coil 21 is wound around the permanent magnet in coaxial relationship. It is connected through the logging cable to a power amplifier 22 that receives current at a low frequency (say 30 c.p.s.) from an LF generator 23. The power amplifier also feeds a conventional phase shifter 24 which in turn feeds a balanced mixer 25 (balanced modulator) with current at 30 c.p.s.

The output of the preamplifier in the logging head is fed through the logging cable to a communications receiver 26 which in turn feeds a narrow band amplifier 27 (30 c.p.s.), the output of which is also sent to the balanced mixer.

The output of the balanced mixer is fed to a recorder 28 which produces a record 29. If desired, an additional indication of the condition of the RF bridge containing the detector coil may be obtained with a conventional cathode-ray oscilloscope 30 whose horizontal plates are driven by the amplified phase-shifted 30 c.p.s. output of the low-frequency generator.

A nucleus (say a nucleus of hydrogen contained in a hydrocarbon molecule in the rock adjacent the logging head), under the influence of the field produced by the permanent magnet, will precess about the direction of the lines of force in the field with a frequency $$f = \frac{\text{magnetic field strength}}{\text{Planck's Constant}} \times \frac{\text{Magnetic moment of nucleus}}{\text{Angular momentum}}$$

If the RF generator is adjusted so that its output is of the same frequency, a condition of nuclear resonance is attained and the nucleus will absorb energy from the circuit. The amount of absorption, i.e. the net number of nuclei excited per unit time, is indicated by the amount of unbalance that results at the mixing point. It is the function of the rest of the apparatus to measure the amount of unbalance as compared to a reference value.

There should be a small phase or amplitude unbalance signal present at resonance. If amplitude unbalance is used, absorption is displayed. If phase unbalance is used, phase-shift or dispersion curve is displayed on the oscilloscope employed.

If a substantially homogeneous DC magnetic field is produced in the regions of the formations in which nuclear resonance phenomena is measured, the reference value of the unbalance signal is obtained by sweeping the field produced by the permanent magnet in the rock back and forth through the resonance value. A low-frequency alternating current passed through the modulating coil brings this about. This current is supplied by the low-frequency generator through the power amplifier. Current of 30 c.p.s. is suitable for modulation or sweep purposes and will produce a persistent image of the unbalance signal on the cathode ray oscillograph. The signal is placed on the vertical plates of the cathode ray oscillograph while its horizontal plates are driven by the 30 c.p.s. current, and the oscillograph trace, as shown in FIG. 1, is a peak rising from a level background. The height of this resonance peak is a measure of the amount of resonance taking place and hence of the concentration of the hydrogen-containing compound, say a hydrocarbon, for which the apparatus is tuned.

The cathode ray oscillograph is convenient for recording purposes (but allows too much noise to interfere with the signal) and in practice is employed primarily for adjusting the apparatus of FIG. 1. A large number of recording systems may be employed, but that illustrated is particularly useful. Its principal elements are the narrow band amplifier and the balanced mixer (or balanced modulator,) and the output of the system (as shown on the record 29) is the derivative of the absorption curve shown on the cathode ray oscillograph. The small field modulation employed produces a 30 cycle signal at the output of the communications receiver. If a narrow sloping portion of the peak is scanned, the receiver output is a 30-cycle wave, the amplitude of which is a measure of the slope of the portion of the peak in the scanning range. The 30-cycle wave is amplified in the narrow-band (30-cycle) amplifier, the output of which is a sinusoidal wave whose amplitude is still a measure of the slope of the absorption curve or peak. This sinusoidal signal and the 30-cycle wave from the LF generator are mixed in the balanced mixer circuit, which gives a DC output proportional to the slope.

If a substantially homogeneous DC magnetic field is produced in the regions of the formations in which nuclear resonance phenomena is measured and the magnetic field is varied through the resonance value by varying the current in the modulating coil wound on the magnet, a curve is traced by the recorder which is a plot of the magnitude of the unbalance signal, which may be either plus or minus, against the magnetic field strength. As shown in FIG. 1, the height of the absorption peak or intensity of line is measured by the sum of the maximum and minimum distances from the base line along the horizontal axis of the record. These maximum and minimum distances actually measure the maximum and minimum slopes of the absorption line, but these are themselves a measure of the height to which the absorption line rises. The line width is indicated by the vertical distance from the maximum to the minimum of the curve.

The relaxation time can be calculated from the height of the absorption peak by the method described by Bloembergen, Purcell and Pound in section IV of their article in Physical Review 73 p. 679 (1948).

The resonant frequency is, of course, obtained directly from the setting of the variable RF signal generator.

The hydrogen nuclei (protons) in pure water at room temperature have a relatively long relaxation time (about 2 seconds) and those in typical crude oil at room temperature have a relatively short relaxation time (of the order of 0.1 seconds or less.) Under the condition of absorption dynamic equilibrium is obtained. The rate at which energy is absorbed from the RF coil depends on the rate at which excited nuclei are deexcited. Hence, the short relaxation time characteristic of the hydrocarbons allows a greater energy absorption and thereby a stronger signal.

The presence of paramagnetic material in the formation tends to decrease the relaxation time by increasing the coupling of the lattice to the nuclear moment, say to that of protons in water. The paramagnetic salts in the formations are ordinarily soluble in water but not in crude oil. Hence the presence of such salts tends to reduce the relaxation time in water, but they do not appreciably affect the relaxation time in hydrocarbons. In consequence, the difference in observed relaxation time for water and hydrocarbon proton magnetic moments will become smaller, and it will become more difficult to get an indication of the presence of hydrocarbons in the rock adjacent to the well bore as the concentration of paramagnetic materials in or adjacent to the bore increases. Free oxygen is paramagnetic as are iron, cobalt, nickel, chromium, copper, manganese and their ions, iron ammonium alum and potassium ferricyanide.

The apparatus of FIG. 1 may be incorporated in the actual drilling equipment so that the logging head is carried close to the bit as the latter penetrates into the ground. In this fashion, the well is logged as it is drilled and hydrocarbon-containing structures are detected as soon as they are encountered. In still another procedure, the logging head is held stationary at a series of levels in the bore. At each level, the RF frequency to the detector coil is varied over a substantial range and the frequencies corresponding to the maximum absorption signal at each level is noted. In this fashion a log is obtained in which frequency for maximum absorption signal is plotted against well depth. SUch logs, taken in different wells in the same field, are useful for correlation purposes.

The foregoing procedure may be varied by periodically varying or sweeping the frequency of the applied RF wave over a predetermined range as the logging head is drawn continuously along the well bore. Again, maximum absorption signals are observed and correlated with well depth, the result being a log which is useful for correlation purposes.

The locations at which nuclear resonance occurs is determined by the strength of the DC magnetic field and the frequency of the RF field. Thus, if the logging head is held stationary at selected levels in the well bore, the depth of invasion of the formations by the drilling fluid, acidizing solutions, etc., can be measured by varying the strength of the DC magnetic field over a wide range. In this fashion logs are obtained showing the characteristics of the formations along planes disposed perpendicularly with respect to the well bore.

In the apparatus of FIG. 1, the signal indicating the attainment of a condition of nuclear resonance adjacent the logging head is the result of absorption of energy from the RF circuit including the detection coil, the process having been designated as one of nuclear absorption. The attainment of the condition of nuclear resonance may also be indicated by a phase shift of the signal in the energizing RF circuit (nuclear dispersion) or by an induced signal in an entirely separate circuit (nuclear induction). The apparatus of FIG. 2 is of the latter type and employs a separate induction coil to pick up a signal accompanying the attainment of nuclear resonance within the magnetic field produced by the logging head.

The apparatus of FIG. 2 comprises a logging head 40 adapted to be drawn along a well bore 41 by a conventional logging cable 42 which contains the various leads to the surface equipment 43. The logging head contains an upright permanent bar magnet 44 that has sufficiently great magnetic moment that its lines of force penetrate the adjacent rock wall of the bore. An RF energizing coil 45 is disposed in the logging head in the field of the magnet and perpendicular to its axis. It is energized through the cable from an adjustable RF signal generator 46 at the surface.

A pickup coil 47 is disposed adjacent the RF energizing coil in inductive relationship with it and perpendicular to the axes of both the energizing coil and the bar magnet. Its output goes through the cable to an RF amplifier 48 of a communications receiver 49 at the surface, and this amplifier in turn feeds a conventional radio detector 50. The output of the detector is connected to an audio amplifier 51.

A low frequency modulating coil 52 is wound around the bar magnet in coaxial relationship with it, and is energized with low-frequency current, say 30 c.p.s., by a power amplifier 53 which is energized by a low-frequency generator 54.

The low-frequency current sent through the modulating coil also passes through a resistance 55, and the voltage drop across this resistance actuates the horizontal sweep of a cathode-ray oscilloscope 56, the vertical sweep of which is controlled by the output of the audio amplifier. The horizontal plates produce a deflection proportional to the variation in the magnetic field in the logging head. The vertical plates produce a deflection proportional to the signal induced in the pickup coil, which in turn depends upon the nuclear magnetic moment due to a particular nuclear species, say protons, in the adjacent formation.

If the apparatus of FIGS. 1 and 2 is arranged so that the DC magnetic field is substantially uniform in the regions in which nuclear resonance phenomena is to be observed, nuclear resonance occurs in localized regions and logs of the type shown may be obtained.

Ordinarily it is necessary to employ a nonhomogeneous magnetic field having a strength which varies with distance from the magnet. If a nonhomogeneous DC magnetic field is employed, the DC and RF fields can be arranged so that the conditions for nuclear resonance are met only in a shell which resembles a barrel stave, the radius of which is determined by the strength of the DC magnetic field and the frequency of the RF field. In this case nuclear resonance phenomena may be observed when the nuclei being investigated are present in the shell. In this manner, the effect of hydrogen atoms in the well fluids is eliminated and the nuclear resonance phenomena is confined to the formations surrounding the well bore. The locations in the formations where nuclear resonance phenomena occurs can be controlled by adjusting the strength of the DC magnetic field or the frequency of the RF field.

If a nonhomogeneous DC magnetic field is employed, varying the field strength serves to extend the regions in which nuclear resonance tends to occur. This is because modulating the DC magnetic field serves to vary the locations at which the DC magnetic field strength and the frequency of the RF field are properly proportioned to cause nuclear resonance for nuclei of a particular type.

The resonance intensity and the magnitude of the resonance signal are determined by the characteristics of the nuclei undergoing resonance and by their spacing from the logging head. Thus, when a nonhomogeneous DC magnetic field is employed, the magnitude of the resonance signal provides an indication of the presence of the nuclei being investigated.

FIGS. 3 and 4 illustrate records obtainable with the apparatus of FIG. 1 when a nonhomogeneous DC magnetic field is produced in the regions in which nuclear resonance phenomena is measured. Both the record 29' and the oscilloscope display 30' provide indications of the magnitude of the nuclear resonance signals. The nuclear resonance signals are somewhat obscured by the background noise signals, but the two types of signals can be clearly distinguished. On the record 29' of FIG. 3, the nuclear resonance signals are indicated as displacements which are substantially larger than those caused by the background noise. On the oscilloscope 30' of FIG. 4, the magnitude of nuclear resonance signal is indicated by the magnitude of the sine wave which is displayed. The effect of the background noise on the oscilloscope display can be reduced by providing a time-exposure photograph of the display so that most of the noise is averaged out on the photograph.

The arrangements shown in FIG. 1 and 2 require large amounts of power for modulating the DC magnetic field. This difficulty can be overcome by maintaining a constant DC magnetic field and by sweeping the frequency of the RF wave over a predetermined range.

If a constant nonhomogeneous DC magnetic field is established in the formation adjacent a borehole and an unmodulated alternating signal having its magnetic component disposed approximately perpendicular to the DC magnetic field is increased from a low frequency to a high frequency, the amplitude of the nuclear resonance signal produced in the formation would be as indicated in FIG. 5.

A low-frequency signal tends to cause nuclear resonance at locations where the DC magnetic field is small, and this occurs at locations which are remote from the borehole. Increasing the frequency of the alternating signal causes portions of the formation which are situated nearer the borehole to provide the nuclear resonance signal because the DC magnetic field is stronger there. The largest nuclear resonance signal amplitude is ordinarily obtained from the region surrounding the borehole which has been penetrated by the drilling fluid, where the DC magnetic field is the strongest and hence the required alternating signal is of high frequency. Still higher frequencies produce no nuclear resonance signal because DC magnetic fields of sufficient strength to cause nuclear resonance at such frequencies are not produced in the formation.

Figure 6:
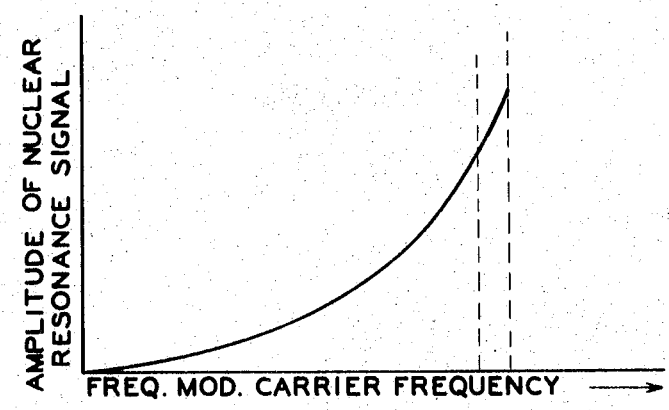

FIG. 6 illustrates the nuclear resonance signal obtainable if the alternating magnetic signal is frequency modulated while its carrier is slowly increased from a low to a high frequency. The curve of FIG. 6 is qualitatively the derivative of the curve of FIG. 5 with respect to the carrier frequency.

Curves similar to those of FIGS. 5 and 6 are obtained if the frequency of an unmodulated radio frequency signal is maintained constant and the strength of the DC magnetic field at the borehole axis is varied over a wide range.

FIGS. 7 and 9 illustrate two arrangements for well logging wherein an unmodulated, nonhomogeneous DC magnetic field is employed, and wherein the alternating magnetic signal is frequency modulated.

The apparatus of FIG. 7 comprises a logging head 60 which is similar to the head 40 of FIG. 2. A pair of permanent magnets 61, 62 serve to provide a DC magnetic field in the formations adjacent the logging head. A RF energizing coil 63 serves to provide an alternating magnetic field in the formations, and a pickup coil 64 serves to sense the nuclear resonance signals which are produced in the formations. The axis of the energizing coil 63 should be disposed approximately perpendicular with respect to the axis along which the magnets 61, 62 lie, and the axis of the pickup coil 64 should be disposed perpendicular to the axes of both the energizing coil and the magnets.

The energizing coil 63 is provided with frequency modulated radio frequency energy from a generator 65, the output of which is alternately coupled to the energizing coil 63 and a variable attenuator 66 by an electronic switch 67 which is controlled by a pulse generator 68.

The pickup coil 64 and the output of the variable attenuator 66 are coupled to the input of a RF receiver 69. The signal entering the receiver is amplitude modulated at the frequency of the pulse generator 68 if the signals from the pickup coil 64 and the attenuator 66 are unequal, and this modulation is measured by applying the output signal of the receiver and a signal from the pulse generator to a phase-sensitive detector 70. The output of the detector is applied to a recorder 71 which serves to produce a record 72 of the type illustrated.

If desired, an additional indication may be provided by a cathode-ray oscilloscope 73 having its vertical-deflection system coupled to the output of the receiver 69 and having its horizontal sweep circuit coupled to the output of the pulse generator 68 so as to synchronize the operation of the oscilloscope with the pulse signals. Time-exposure photographs of the displays on the oscilloscope may be employed to average out most of the noise signals and thereby make the nuclear resonance signals easier to read.

The RF signal generator 65 should apply a signal of constant amplitude to the energizing coil 63, and the signal should be frequency modulated through a band width of about $f_o/Q_R$, where $f_o$ is the carrier frequency of the RF signal generator 65 and $Q_R$ is the quality factor of the detector coil of the receiver 69. The modulation period should be substantially less than the relaxation times of the nuclei being investigated.

The purpose of frequency modulation in the apparatus of FIG. 7 is to increase, in effect, the volume of the formation contributing to the nuclear resonance signal, thereby increasing the magnitude of the nuclear resonance signal.

In the case of no frequency modulation, only those portions of the total formation will contribute to the nuclear resonance signal which are within the magnetic field range:

$$H_o = (2\pi/\gamma) \cdot (f_o \pm 1/\pi T_2)$$

where $H_o$ is the DC magnetic field strength, $\gamma$ is a constant, $f_o$ is the resonance frequency, and $T_2$ is the true spin—spin relaxation time for the protons being investigated.

For a typical case, $1/\pi T_2 \approx 1$ and $f_o \approx 10^5$ c.p.s. If the magnetic field $H$ drops off about as the inverse cube of the distance from the borehole due to its inhomogeneous nature, the region where the magnetic field strength is proper or producing nuclear resonance is quite small if the RF signal is of constant frequency.

If RF signal is frequency modulated, the regions contributing to the nuclear resonance signal comprise portions of the formation where the DC magnetic field is within the range:

$$H_o = (2\pi/\gamma) \cdot (f_o \pm f_o/2Q_R)$$

For a typical case $f_o \approx 10^5$ and $Q_R \approx 50$. Comparing the result with that in the case of no modulation, about 1,000 times more of the formation contributes to the nuclear resonance signal. Thus, the critical signal-to-noise ratio should be improved by about the same factor of 1,000.

Figure 8A:
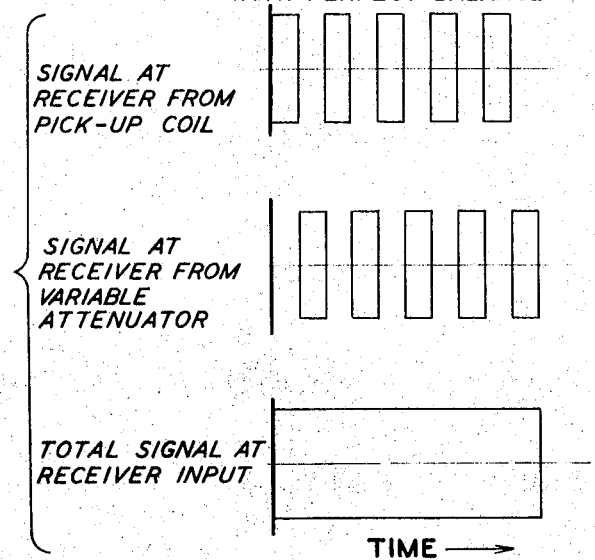
FIGS. 8A and 8B show curves which illustrate the operation of the apparatus of FIG. 7.
Figure 8B:
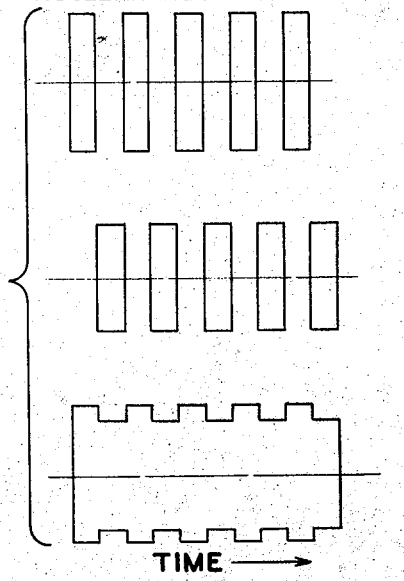

In the operation of the apparatus of FIG. 7, the variable attenuator 66 is adjusted so that the input voltages to the RF receiver 69 from the pickup coil and from the variable attenuator are identical in the absence of a nuclear resonance signal, as illustrated in FIG. 8A. Then when a nuclear resonance signal is sensed by the pickup coil 64, the total signal which is applied to the input of the RF receiver 69 is amplitude modulated at the frequency of the pulse generator 68, as illustrated in FIG. 8B.

It is to be noted that the pickup coil always provides a strong signal to the receiver due to leakage from the energizing coil, even in the absence of a nuclear resonance signal. Hence the balancing arrangement of FIG. 7 is employed so that nuclear resonance signals can be distinguished from the leakage signal.

In order to locate petroleum deposits in the well formations, the carrier frequency of the RF signal generator 65 is adjusted so that the logging apparatus responds to nuclei of hydrogen atoms. As the logging head is moved along the well bore, nuclear resonance signals are detected and a log of the type illustrated in FIG. 7 is produced. Then the logging head is positioned at each location in the well bore a which nuclear resonance signals were observed, and saturation curves are obtained so as to ascertain whether the hydrogen nuclei which produced the nuclear resonance signals are in petroleum or in water deposits. The saturation curves are determined by measuring the amplitude of the nuclear resonance signal as the amplitude of the radio frequency signal produced by the generator 65 is increased step-by-step from very low to very high values. The RF signal strength required to cause saturation of the formation is dependent upon the thermal relaxation times of the nuclei being investigated. Hence, the signal strength required to saturate the formation provides an indication of the type and chemical state of the nuclei in the formation.

It is to be noted that a slight amplitude difference in the signals appearing at the receiver input due to improper adjustment of the variable attenuator 66 is indistinguishable from a nuclear resonance signal. Hence the energizing coil 63 and the pickup coil 64 should be constructed and mounted so that the electrical coupling between the two coils is constant over long periods of time, and the variable attenuator 66 should be stable in operation and should permit very fine control of the voltage which is applied through it to the receiver.

Ordinarily the balance provided by the variable attenuator 66 should be checked while the logging head is in the borehole during the logging operation. One way for checking the balance is to reduce the amplitude of the RF signal produced by the generator 65 to such a low level that any nuclear resonance signal is diminished beyond the limits of detectability. Below the region of saturation, the amplitude of the nuclear resonance signal is proportional to the amplitude of the RF signal produced by the generator 65. However, the noise signals entering the receiver are substantially independent of the amplitude of the RF signal produced by the generator 65. Hence, at low signal-generator voltages, any nuclear resonance signal is completely swamped out by the noise signals.

Another way for checking the balance provided by the variable attenuator 66 is to turn off the frequency modulation of the carrier signal produced by the generator 65 and to adjust the generator 65 so that it provides a RF signal of high amplitude, thereby saturating the formation to such an extent that no nuclear resonance signal is detectable. Under such conditions, the balance provided by the variable attenuator can be checked.

FIG. 9 illustrates a modification of the apparatus of FIG. 7, wherein the RF energizing coil is energized continuously by the signal generator. This arrangement has the advantage that any undesirable transient nuclear resonance signals due to pulsing the radio frequency energy are eliminated.

The apparatus of FIG. 9 differs from that of FIG. 7 in that the energizing coil 63' is energized continuously by the signal generator 65', the pickup coil 64' is connected to the receiver 69' through the electronic switch 67', and the variable attenuator 66' is connected between the signal generator 65' and the electronic switch 67' rather than being connected between the electronic switch and the receiver. If desired, a preamplifier 74 having a good noise figure may be employed between the pickup coil 64' and the receiver 69' so as to improve the signal-to-noise ratio.

The operation of the apparatus of FIG. 9 is similar to that of the apparatus of FIG. 7 and differs only in that the commutation introduced by the electronic switch is at the input of the receiver rather than being at the output of the transmitter. Waveforms of the type illustrated in FIGS. 8A and 8B are applied to the input of the receiver, and the records of nuclear resonance phenomena are approximately the same in these two embodiments of the invention. Hence the apparatus of FIG. 9 may be employed in the same manner as described above with reference to FIG. 7.

Although the invention has been described with particular reference to oil well logging, it is not restricted to such an application and may be employed to locate minerals other than petroleum hydrocarbons. Thus it may be used in exploratory openings, such as drill holes, in mines and the like to locate any element which does not have an even number both of protons and of neutrons in its nucleus so that it has a net magnetic moment.

I claim:

1. In well logging, the improvement which comprises producing a unidirectional magnetic field in a region including earth adjacent the well, simultaneously producing in the same region an alternating magnetic field having a component of its vector transverse to that of the unidirectional magnetic field, the alternating magnetic field being tuned to the resonance frequency for nuclei of atoms present in a substance contained in the region, and detecting the resulting input of energy from the alternating magnetic field to the nuclei.

2. In well logging, the improvement which comprises producing a unidirectional magnetic field in a region including earth adjacent the well, simultaneously producing in the same region an alternating magnetic field having a component of its vector transverse to that of the unidirectional magnetic field, the alternating magnetic field being tuned to the resonance frequency for nuclei of atoms of a petroleum hydrocarbon, and detecting the resulting input of energy from the alternating magnetic field to the nuclei when the petroleum hydrocarbon is present in the region.

3. In well logging, the improvement which comprises producing a unidirectional magnetic field in a region including earth adjacent one portion of the well, simultaneously producing in the same region an alternating magnetic field having a component of its vector transverse to that of the unidirectional magnetic field, the alternating magnetic field being tuned to the resonance frequency for nuclei of atoms present in a substance contained in the region, detecting the resulting input of energy from the alternating magnetic field to the nuclei, and repeating the foregoing steps at another portion of the well.

4. In well logging, the improvement which comprises producing a unidirectional magnetic field in a region including earth adjacent the bottom of the well as drilling proceeds, simultaneously producing in the same region an alternating magnetic field having a component of its vector transverse to that of the unidirectional magnetic field, the alternating magnetic field being tuned to the resonance frequency for nuclei of atoms present in a substance contained in the region, and detecting the resulting input of energy from the alternating magnetic field to the nuclei.

5. In well logging, the improvement which comprises producing a unidirectional magnetic field in a region including earth adjacent the well, simultaneously producing in the same region an alternating magnetic field having a component of its vector transverse to that of the unidirectional magnetic field, the alternating magnetic field being tuned to the resonance frequency for nuclei of atoms present in substance sought for in the region, and detecting the resulting input of energy from the alternating magnetic field to the nuclei when the substance is present in the region.

6. In well logging, the improvement which comprises producing a unidirectional magnetic field in a region including earth adjacent the well, simultaneously producing in the same region an alternating magnetic field having a component of its vector transverse to that of the unidirectional magnetic field, the alternating magnetic field being tuned to the resonance frequency for nuclei of atoms present in a substance sought in the earth adjacent the well, and detecting the condition of nuclear resonance which results when said substance is present in said region.

7. Process according to claim 6 in which the width of the frequency band in which the condition of resonance occurs is determined.

8. Process according to claim 6 in which the relaxation time of the nuclei from said condition of resonance is determined.

9. In well logging, the improvement which comprises producing a unidirectional magnetic field in a region including earth adjacent the well, simultaneously producing in the same region an alternating magnetic field having a component of its vector transverse to that of the unidirectional magnetic field, the alternating magnetic field being tuned to the resonance frequency for nuclei of atoms present in a substance contained in the region, detecting the resulting input of energy from the alternating magnetic field to the nuclei, and measuring the frequency of the alternating magnetic field when said input of energy occurs.

10. In well logging, the improvement which comprises producing a unidirectional magnetic field in a region including earth adjacent the well, simultaneously producing in the same region a first alternating magnetic field having a component of its vector transverse to that of the unidirectional magnetic field, the first alternating magnetic field being tuned to the resonance frequency for nuclei of atoms present in a substance contained in the region, detecting the resulting input of energy from the first alternating magnetic field to the nuclei, and modulating the DC magnetic field by superimposing upon it a second alternating magnetic field of relatively low frequency so as to sweep back and forth through the condition of nuclear resonance which occurs when frequency of the first alternating magnetic field is tuned to said nuclei 11. Process according to claim 10 in which the width of the frequency band at which the condition of nuclear resonance occurs is determined.

12. Process according to claim 10 in which the relaxation time for the nuclei from the condition of resonance is measured.

13. In well logging, the improvement which comprises subjecting the well at a plurality of different depths to the simultaneous actions of a unidirectional magnetic field and an oscillating magnetic field having a component of its vector transverse to that of the unidirectional magnetic field, tuning the oscillating magnetic field to the resonance frequency for the nuclei of hydrogen atoms present in a petroleum compound, and detecting at said plurality of depth the input of energy which occurs from the oscillating magnetic field to the nuclei when the latter are encountered.

14. In well logging, the improvement which comprises producing a unidirectional magnetic field in the earth adjacent the well, simultaneously producing in the region in which the unidirectional magnetic field is present an alternating magnetic field having a component of its vector transverse to that of the unidirectional magnetic field, this component being relatively weak with respect to the unidirectional magnetic field, and detecting energy exchange between the alternating magnetic field and substances in the earth within the unidirectional magnetic field and containing nuclei in resonance with the alternating magnetic field.

15. In well logging, the improvement which comprises producing a unidirectional magnetic field in the earth adjacent the well, simultaneously producing in the region in which the unidirectional magnetic field is present an alternating magnetic field having a component of its vector transverse to that of the unidirectional magnetic field, this component being relatively weak with respect to the unidirectional magnetic field, and detecting the magnitude of the energy exchange between the alternating magnetic field and substances in the earth within the unidirectional magnetic field and containing nuclei in resonance with the alternating magnetic field.

16. In well logging, the improvement which comprises producing a unidirectional magnetic field in the earth adjacent the well, simultaneously producing in the region in which the unidirectional magnetic field is present an alternating magnetic field having a component of its vector transverse to that of the unidirectional magnetic field, this component being relatively weak with respect to the unidirectional magnetic field, detecting energy exchange between the alternating magnetic field and substances in the earth within the unidirectional magnetic field and containing nuclei in resonance with the alternating magnetic field, and measuring the relaxation time of the nuclei from the condition of resonance.

17. In well logging, the improvement which comprises producing a unidirectional magnetic field in the earth adjacent the well, simultaneously producing in the region in which the unidirectional magnetic field is present an alternating magnetic field having a component of its vector transverse to that of the unidirectional magnetic field, this component being relatively weak with respect to the unidirectional magnetic field, modulating the unidirectional magnetic field, and detecting energy exchange between the alternating magnetic field and substances in the earth within the modulated unidirectional magnetic field and containing nuclei in resonance with the alternating magnetic field.

18. In well logging, the improvement which comprises producing a unidirectional magnetic field in the earth adjacent the well, simultaneously producing in the region in which the DC magnetic field is present an alternating magnetic field having a component of its vector transverse to that of the unidirectional magnetic field, this component being relatively weak with respect to the unidirectional magnetic field, and measuring the energy exchange between the alternating magnetic field and substances in the earth within the unidirectional magnetic field and containing nuclei in resonance with the alternating magnetic field, the energy exchange being measured with respect to its frequency dependence.

19. In apparatus for well logging, the combination which comprises a logging head adapted to be moved along a well bore, a magnet in the head for producing a unidirectional magnetic field in material around the well bore, means disposed in the head for producing an alternating magnetic field in the region of the unidirectional magnetic field and having a component of its vector transverse to that of the unidirectional magnetic field, an adjustable radio-frequency signal generator connected to the means for producing the alternating magnetic field, and means for detecting the input of energy from the alternating magnetic field to the material under a condition of nuclear resonance for the material.

20. Apparatus according to claim 19 provided with a coil disposed in the head and with its axis substantially parallel to that of the unidirectional field and means for applying a low-frequency alternating current to the coil to cause the condition of nuclear resonance to be attained periodically.

21. Apparatus according to claim 19 provided with a coil disposed in the head and with its axis substantially parallel to that of the unidirectional magnetic field, means for applying a low-frequency alternating current to the coil to cause the condition of nuclear resonance to be attained periodically, and means for measuring the width of the frequency band in which the condition of resonance is attained.

22. Apparatus according to claim 19 provided with a coil disposed in the head for modulating the unidirectional magnetic field, means for applying a low-frequency alternating current to said coil to cause the condition of nuclear resonance to be attained periodically, and means for measuring the relaxation time from the condition of resonance.

23. In apparatus for well logging, the combination which comprises a logging head adapted to be moved along a well bore, a bar magnet in the head with its axis in the direction of the bore for producing a unidirectional magnetic field in material around the bore, a coil disposed in the head for producing an alternating magnetic field in the region of the unidirectional magnetic field and having a component of its vector transverse to that of the unidirectional magnetic field, an adjustable radio-frequency signal generator connected to the coil, and means for detecting the input of energy from the alternating magnetic field to the material under conditions of nuclear resonance for the material.

24. In apparatus for well logging, the combination which comprises a logging head adapted to be moved along a well bore, a permanent bar magnet disposed in the head in the direction of the well bore and having a magnetic moment sufficient to produce a unidirectional magnetic field in material adjacent the well bore, means disposed in the head for producing an alternating magnetic field in the region of the unidirectional magnetic field and having a component of its vector transverse to that of the unidirectional magnetic field, an adjustable radio-frequency signal generator connected to the means for producing the alternating magnetic field, and means for detecting the input of energy from the alternating magnetic field to the material under conditions of nuclear resonance in the material.

25. Apparatus for well logging which comprises means for producing a unidirectional magnetic field in a region including earth adjacent the well, means for simultaneously producing in the same region an alternating magnetic field having a component of its vector transverse to that of the unidirectional magnetic field, the means for producing the alternating magnetic field being tuned to the resonance frequency for nuclei of atoms of a predetermined type, and means including apparatus for detecting the resulting input of energy from the alternating magnetic field to the nuclei for providing a comparison of the relaxation times for the nuclei of said atoms at a plurality of locations in the well.

26. The apparatus of claim 25 wherein the alternating magnetic field is tuned to the resonance frequency for protons of hydrogen atoms.

27. Apparatus for well logging comprising means for producing a unidirectional magnetic field in a region including earth adjacent the well, means for simultaneously producing in the same region an alternating magnetic field having a component of its vector transverse to that of the unidirectional magnetic field, means for producing the alternating magnetic field being tuned to the resonance frequency for nuclei of atoms of a predetermined type, and means for detecting the intensity of the nuclear resonance which results in said region.

28. The apparatus of claim 27 further including means for periodically varying the strength of the unidirectional magnetic field.

29. The apparatus of claim 27 further including means for periodically varying the frequency of the alternating magnetic field.

30. The apparatus of claim 27 further including means for frequency modulating the alternating magnetic field at a modulation period which is less than the relaxation time of the nuclei being investigated.

31. Apparatus for well logging comprising means for producing a unidirectional magnetic field in a region including formations adjacent the well bore, generator means for simultaneously producing in the same region a frequency-modulated alternating magnetic field having a component of its vector transverse to that of the unidirectional magnetic field, the carrier frequency of the generator means being tuned to the resonance frequency for nuclei of hydrogen atoms, receiving means for producing an indication of the amplitude of alternating signals, means for providing a reference alternating signal from the generator means, means for providing an alternating signal having an amplitude which varies with the intensity of the nuclear resonance which results in said region, and means for causing said alternating signals to be applied alternately to the input of the receiving means so that the receiving means provides an indication of the difference between the amplitudes of the two signals.

32. The apparatus of claim 31 wherein the carrier frequency of the generator means is frequency-modulated through a band width which is approximately equal to the frequency of the carrier divided by the quality factor of the receiving means, and wherein the modulation period is substantially less than the relaxation time of the nuclei of the hydrogen atoms being investigated.

33. In well logging, the improvement which comprises producing a nonhomogeneous unidirectional magnetic field in a region including the formations adjacent the well bore, simultaneously producing in the same region an alternating magnetic field having a component of its vector transverse to that of the unidirectional magnetic field, the strength of the unidirectional magnetic field and the frequency of the alternating magnetic field being adjusted to cause nuclei of atoms of a certain type in the region to resonate at locations spaced predetermined distances from the well bore, and detecting the response of the nuclei to the magnetic fields.

34. The method of claim 33 wherein the strength of the unidirectional magnetic field in said region is varied so that the response of the nuclei to the magnetic fields can be detected.

35. The method of claim 33 wherein the frequency of the alternating magnetic field is varied so that the response of the nuclei to the magnetic fields can be detected.

36. The method of claim 33 wherein the alternating magnetic field is frequency-modulated and the modulation period is less than the relaxation time of the nuclei being investigated.

37. In well logging, the improvement which comprises producing a nonhomogeneous unidirectional magnetic field in a region including formations adjacent the well bore, simultaneously producing in the same region an oscillating magnetic field having a component of its vector transverse to that of the unidirectional magnetic field, the frequency of the oscillating magnetic field and the strength of the unidirectional magnetic field being proportioned to cause nuclei of hydrogen atoms in the region to resonate, varying one of the magnetic fields to vary the locations in the region at which the nuclei resonate, and detecting the response of the nuclei to the magnetic fields.

38. In well logging, the improvement which comprises producing a nonhomogeneous unidirectional magnetic field in a region including formations adjacent the well bore, simultaneously producing in the same region a frequency-modulated radio frequency magnetic field having a component of its vector transverse to that of the unidirectional magnetic field, the radio frequency field being tuned to the resonance frequency for nuclei of hydrogen atoms, and detecting the intensity of the nuclear resonance which results in said region.

39. The method of claim 38 further including the step of varying the amplitude of the radio frequency field to ascertain the signal strength required to saturate the formations in said region, thereby providing a measure of the relaxation time of the nuclei in the region.

40. In well logging, the improvement which comprises producing a nonhomogeneous unidirectional magnetic field in a region including the formations adjacent the well bore, simultaneously producing in the same region an alternating magnetic field having a component of its vector transverse to that of the unidirectional magnetic field, the strength of the unidirectional magnetic field and the frequency of the alternating magnetic field being adjusted to cause nuclei of hydrogen atoms to resonate at locations spaced predetermined distances from the well bore, detecting the intensity of the nuclear resonance which results in said region, and varying the amplitude of the alternating magnetic field to ascertain the signal strength required to saturate the formations in said region, thereby providing an indication of the relaxation times of the nuclei of hydrogen atoms in the region.

41. In a method of investigating wells drilled into the earth, the steps of establishing a substantially constant magnetic field in earth formation traversed by a well, simultaneously establishing in said formation at an angle to said constant field an alternating magnetic field at a frequency substantially equal to the frequency of precession of nuclei of an element embodying magnetic properties and comprising said formation, and obtaining indications of the relaxation time of said nuclei.

42. A well logging apparatus comprising an elongated instrument adapted to be moved through a well bore along its principal axis including means for producing a unidirectional magnetic field having flux lines which pass through a region located along the principal axis of the instrument outside the tool, means for simultaneously producing an alternating magnetic field coincident with and having a component of its vector transverse to that of the unidirectional magnetic field, the means for producing an alternating magnetic field being tuned to the resonance frequency for nuclei of predetermined atoms, and means for detecting the response of said nuclei to the magnetic fields.

43. In apparatus for investigating a borehole drilled into the earth, the combination of first magnet means mounted for movement through the borehole and disposed so as to subject nuclei having magnetic properties and comprising material in the well to a unidirectional magnetic field, coil means mounted in one arm of an impedance bridge and disposed so as to subject said nuclei to an alternating magnetic field directed at an angle to said unidirectional field, a source of constant frequency alternating current connected to energize said bridge, means for periodically sweeping the amplitude of said unidirectional field through a range including at least one value for which Larmor precession of said nuclei will occur, and means for providing indications of energy absorbed from said alternating field.

44. In a method for investigating a well drilled into the earth, the steps of subjecting nuclei having magnetic properties and comprising material at a selected level in a well to a polarizing magnetic field, simultaneously subjecting said nuclei to an alternating magnetic field directed at an angle to said polarized magnetic field, varying at least one of two quantities including the amplitude of said polarizing field and the frequency of said alternating field through a range including a value for which Larmor precession of selected nuclei will be sustained, producing a signal representative of said Larmor precession of nuclei, and obtaining indications of said signal.

45. A method as defined in claim 44 in which indications are obtained of an effect caused by the Larmor precession of the nuclei only during a selected portion of the range through which said quantity is varied.

46. A method as defined in claim 44 in which the range through which said one quantity is varied is greater than a line width, and indications are obtained of the energy absorbed from said alternating field.

47. A method as defined in claim 44 in which the range through which said one quantity is varied is less than a line width and dispersion-type indications are obtained of the energy absorbed from said alternating field.

48. In apparatus for investigating a borehole drilled into the earth, the combination of first magnet means mounted for movement through the borehole and disposed so as to subject nuclei having magnetic properties and comprising material in a well to a polarizing magnetic field, second magnet means mounted in fixed relation to said first magnet means for subjecting said nuclei to an alternating magnetic field directed at an angle to said polarizing field, means for varying at least one of two quantities including the amplitude of said polarizing field and the frequency of said alternating field through a range including a value for which Larmor precession of selected nuclei will be sustained, means providing a signal representative of said Larmor precession of nuclei, and means providing indications of said signal.

49. Apparatus as defined in claim 48 in which said signal providing means comprises coil means disposed in inductive relation to magnetic field components normal to a plane defined by the intersecting axes of said polarizing field and said alternating field.

50. In a method of determining the magnetic resonance properties of that portion of material located at a predetermined depth beneath the surface of said material, the steps of applying a substantially constant divergent magnetic field between spaced-apart locations on said surface whereby said field decreases in intensity with the distance behind said surface, applying an alternating magnetic field perpendicularly to said constant field in said material and at a frequency equal to the resonance precession frequency of selected paramagnetic particles in a constant field of the particular intensity of said constant field at the predetermined depth of said portion, and obtaining indications of the magnetic resonance in said particles.

51. In apparatus for geophysical exploration in wells drilled into the earth, the combination of an enclosure adapted to be lowered into a well, means in said enclosure for producing a substantially constant magnetic field in a region including an earth formation in situ traversed by the well, coil means in said enclosure for producing an alternating field in said region at an angle to said constant field and at a frequency appropriate to produce gyromagnetic resonance, and electrical means cooperating with said constant magnetic field and with said coil means for obtaining indications of relaxation times of gyromagnetic precession of nuclei embodying magnetic properties and comprising molecules of material in said region.

52. In apparatus for geophysical exploration in wells drilled into the earth, the combination of an enclosure adapted to be lowered into a well, means for producing a nuclear magnetic resonance condition in a region of the earth in situ adjacent the well, said means including magnetic means having opposite poles on opposite sides of said enclosure longitudinally of the axis of the well for establishing a substantially constant magnetic field in a region including an earth formation traversed by the well, coil means in said enclosure for establishing an alternating magnetic field in said region at an angle to said constant field, and electrical means cooperating with said constant magnetic field and with said coil means for obtaining indications of relaxation times of gyromagnetic resonance precession of nuclei embodying magnetic properties and comprising molecules of material in said region.

53. Apparatus for geophysical exploration in wells drilled into the earth comprising a well-logging instrument adapted to be passed through the well, said instrument including the combination of means for subjecting earth formations in situ adjacent the well to a magnetic field condition adapted to produce a given detectable condition of gyromagnetic precession in certain elementary particles which may be present in said formation and means for detecting gyromagnetic precession in said formation due to said magnetic field condition, as an indication of the presence of said elementary particles.

54. In a method of geophysical exploration in wells drilled into the earth the steps of subjecting earth formations in situ adjacent the well to a magnetic field condition adapted to produce a given detectable condition of nuclear magnetic precession in certain nuclei embodying gyromagnetic properties which may be present in said formation and detecting nuclear magnetic precession in said formation due to said magnetic field condition to derive a signal which is indicative of the relaxation time for said nuclei as an indication of the presence of said nuclei, and recording a log of the signal derived from the detected precession.

55. A method as defined in claim 54 wherein the detected precession indicates the relaxation times for a plurality of different substances comprising material in said formation and having like nuclei embodying magnetic properties.

56. A method as defined in claim 55 wherein said different substances are oil and water.

57. In a method of geophysical exploration in wells drilled into the earth, the steps of subjecting earth formations in situ adjacent the well to a magnetic field condition adapted to produce a given detectable condition of gyromagnetic precession in certain elementary particles which may be present in said formation and detecting gyromagnetic precession of elementary particles in said formation due to said magnetic field condition, as an indication of the presence of said elementary particles, and recording a log of the detected response.

58. In apparatus for investigating a borehole drilled into the earth, the combination of first magnet means mounted for movement through the borehole and disposed so as to subject nuclei having magnetic properties and comprising material in the well to a substantially constant magnetic field, second magnet means mounted in fixed relation to said first magnet means for subjecting said nuclei to a second magnetic field directed at an angle to said constant magnetic field, frequency modulated oscillator means connnected to energize said second magnet means with alternating current in a range of frequencies including the Larmor precession frequency for selected nuclei, and means for detecting gyromagnetic precession produced in said material due to the fields produced by said magnet means.

59. Bore hole investigating apparatus as defined in claim 58 together with means for exhibiting a trace of the output of said detecting means in time relation to the frequency modulation of said oscillator means.

60. In a method for investigating a well drilled into the earth, the steps of subjecting nuclei having magnetic properties and comprising material in situ at a selected level in the well to a substantially constant magnetic field, simultaneously subjecting said nuclei to an alternating magnetic field directed at an angle to said constant field and oscillating at a frequency substantially equal to the Larmor precession frequency of said nuclei, providing a signal representative of said Larmor precession of the nuclei, and obtaining indications of said signal.

61. A method as defined in claim 60 in which the nuclei having magnetic properties comprise substances in the solid matter beyond the boundary wall of the borehole.

62. A method as defined in claim 60 in which indications are obtained of the energy absorption from said alternating magnetic field resulting from said Larmor precession of the nuclei.

63. In a method for investigating a well drilled into the earth, the steps of subjecting nuclei having magnetic properties and comprising material at a selected level in a well to a substantially constant magnetic field, simultaneously subjecting said nuclei to an alternating magnetic field directed at an angle to said constant field, sweeping the frequency of said alternating field through a range including the Larmor precession frequency of said nuclei, and obtaining indications of the energy absorbed from said alternating magnetic field.

64. In a method for investigating a well drilled into the earth, the steps of subjecting nuclei having magnetic properties and comprising material at a selected level in a well to a first unidirectional magnetic field, simultaneously subjecting said nuclei to an alternating magnetic field directed at an angle to said first field, sweeping the amplitude of said first field through a range including a value for which Larmor precession of selected nuclei will be sustained, providing a signal representative of said Larmor precession of nuclei, and obtaining indications of said signal.

65. In a method for investigating a well drilled into the earth, the steps of subjecting nuclei having magnetic properties and comprising material at different depths in a well to a substantially constant magnetic field, simultaneously subjecting said nuclei to an alternating magnetic field directed at an angle to said constant field, sweeping the frequency of said alternating field through a range including the Larmor precession frequency of said nuclei, and obtaining indications at said different depths of the energy absorbed from said alternating magnetic field.

66. In apparatus for investigating a borehole drilled into the earth, means for producing gyromagnetic precession of elementary particles in material comprising the combination of magnet means mounted for movement through the borehole and disposed so as to subject nuclei having magnetic properties and comprising material in the well to a unidirectional magnetic field, means mounted in fixed relation to said first magnet means for subjecting said nuclei to electromagnetic wave energy at an angle to said unidirectional field, and means providing indications of nuclear magnetic resonance produced in said nuclei by said means for producing gyromagnetic precession.

67. In apparatus for investigating a borehole drilled into the earth, the combination of first magnet means mounted for movement through the borehole and disposed so as to subject nuclei having magnetic properties and comprising material in the well to a substantially constant magnetic field, second magnet means mounted in fixed relation to said first magnet means for subjecting said nuclei to an alternating magnetic field directed at an angle to said constant magnetic field, means for sweeping the frequency of said alternating magnetic field through a range including the Larmor precession frequency for selected nuclei, and means providing indications of the energy absorbed from said alternating field due to Larmor precession of said nuclei.

68. In a method of exploring for minerals in the earth, the steps of subjecting nuclei having magnetic properties and comprising minerals in situ in the earth to a polarizing magnetic field, simultaneously subjecting said nuclei to an alternating magnetic field at an angle to said constant magnetic field, varying one of two quantities including the amplitude of said polarizing field and the frequency of said alternating field through a range including a value for which Larmor precession of selected nuclei will be sustained, providing a signal representative of said Larmor precession of the nuclei, and obtaining indications of said signal.

69. In a method of geophysical exploration in wells drilled into the earth, the steps of subjecting earth formations in situ adjacent the well to a magnetic field condition adapted to produce a given detectable condition of nuclear magnetic resonance in certain nuclei which may be present in said formation, detecting said detectable condition of nuclear magnetic resonance due to said magnetic field condition, as an indication of the presence of said certain nuclei, and providing a signal indication of the detected response.

* * * * *

PO-1050
(5/69)

UNITED STATES PATENT OFFICE
CERTIFICATE OF CORRECTION

Patent No. 3,617,867          Dated November 2, 1971

Inventor(s) Gerhard Herzog

It is certified that error appears in the above-identified patent and that said Letters Patent are hereby corrected as shown below:

INVENTOR'S NAME: "Gerherd" should read --Gerhard--

Col. 1, Lines 25 through 29 should read as follows:

--One of the more serious problems in exploration for and development of petroleum deposits involves the determination of the location and thickness of petroleum containing strata or formations penetrated by the--

Col. 3, Line 1 "$5 \times 10^{120}$" should read --$5 \times 10^{-20}$--

Col. 3, Line 65 "RF" should read --R-F--

Col. 3, Line 68 "RF" should read --R-F--

CLAIM 18, Line 4 "DC" should read --unidirectional--

Signed and sealed this 23rd day of January 1973.

SEAL)
ttest:

DWARD M. FLETCHER, JR.          ROBERT GOTTSCHALK
ttesting Officer          Commissioner of Patents